United States Patent

Fukuma

Patent Number: 5,921,223
Date of Patent: Jul. 13, 1999

[54] CONTROL APPARATUS FOR AN INTERNAL COMBUSTION ENGINE

[75] Inventor: Takao Fukuma, Numazu, Japan

[73] Assignee: Toyota Jidosha Kabushiki Kaisha, Aichi-ken, Japan

[21] Appl. No.: 08/927,648

[22] Filed: Sep. 11, 1997

[30] Foreign Application Priority Data

Sep. 17, 1996 [JP] Japan ................................. 8-244872

[51] Int. Cl.$^6$ ............................ F02D 21/08; F02M 25/07
[52] U.S. Cl. ...................................... 123/568.21; 701/108
[58] Field of Search ........................ 123/568.19, 568.21, 123/568.31, 672; 701/108

[56] References Cited

U.S. PATENT DOCUMENTS

| | | | |
|---|---|---|---|
| 4,142,493 | 3/1979 | Schira et al. ...................... | 123/568.21 |
| 4,461,263 | 7/1984 | Hasegawa .............................. | 701/108 |
| 4,548,185 | 10/1985 | Pozniak ................................. | 701/108 |
| 4,640,257 | 2/1987 | Kodama et al. ....................... | 701/108 |
| 4,924,840 | 5/1990 | Wade .................................. | 123/568.19 |
| 4,938,198 | 7/1990 | Suzuki ............................... | 123/568.21 |
| 4,999,781 | 3/1991 | Holl et al. ......................... | 364/431.05 |
| 5,341,499 | 8/1994 | Stellwagen et al. .............. | 364/431.05 |
| 5,383,126 | 1/1995 | Ogawa et al. ...................... | 364/431.06 |

FOREIGN PATENT DOCUMENTS

| | | |
|---|---|---|
| 62-183057 | 11/1987 | Japan . |
| 1-247754 | 10/1989 | Japan . |
| 2-61347 | 3/1990 | Japan . |
| 5-18323 | 1/1993 | Japan . |
| 5-113148 | 5/1993 | Japan . |
| 08021313 | 1/1996 | Japan . |

*Primary Examiner*—Andrew M. Dollnar
*Assistant Examiner*—Arnold Castro
*Attorney, Agent, or Firm*—Kenyon & Kenyon

[57] ABSTRACT

A control apparatus for an internal combustion engine with an exhaust gas recirculation system is disclosed. The control apparatus grasps an optimum relational expression between an excess air ratio and an EGR rate in a transient engine operating condition changing to a certain engine operating condition. Each combination of the excess air ratio and the EGR rate on the relational expression optimizes an amount of generated paticulates and an amount of generated $NO_x$. The relational expression contains a combination of an optimum excess air ratio and an optimum EGR rate in the certain engine operating condition. The apparatus determines one of a current excess air ratio and a current EGR rate and controls the exhaust gas recirculation system so as to realize the other of an excess air ratio and an EGR rate satisfying the relational expression with respect to one of the current excess air ratio and the current EGR rate.

9 Claims, 4 Drawing Sheets

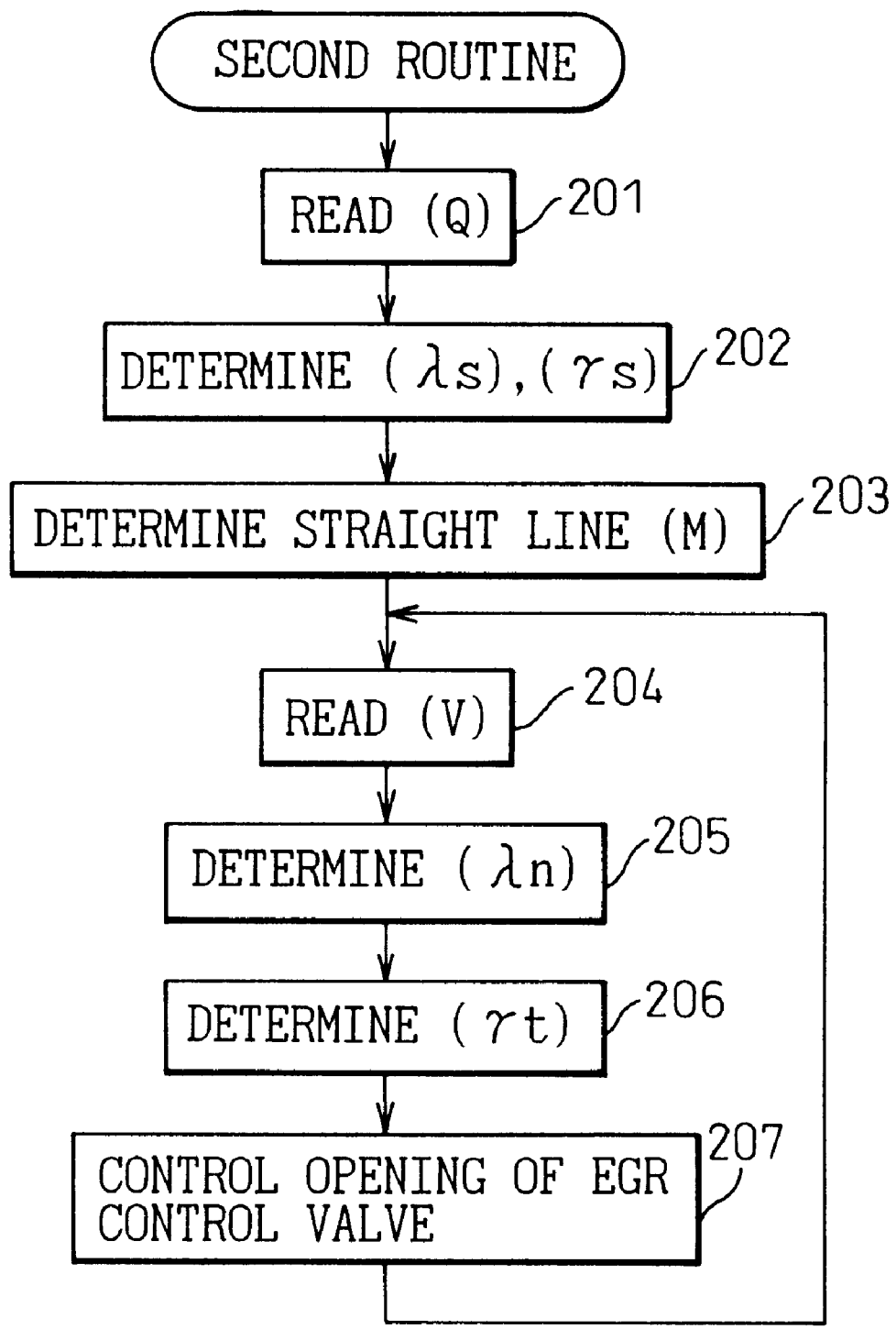

ptimum excess air ratio and an optimum EGR rate in the certain engine operating condition; determining means for determining one of a current excess air ratio and a current EGR rate; and control means for controlling the exhaust gas recirculation means so as to realize the other of an excess air ratio and an EGR rate satisfying the relational expression with respect to the one of the current excess air ratio and the current EGR rate.

CONTROL APPARATUS FOR AN INTERNAL COMBUSTION ENGINE

BACKGROUND OF THE INVENTION

1. Field of the Invention

The present invention relates to a control apparatus for an internal combustion engine.

2. Description of the Related Art

In a well-known internal combustion engine such as a diesel engine, an exhaust gas recirculation path communicating between an exhaust system and an intake system is provided so that the exhaust gas is recirculated into the cylinders whereby the combustion temperature is lowered thereby to reduce the amount of $NO_x$ generated. The larger the amount of the recirculated exhaust gas is, the greater the amount of the generated $NO_x$ can be reduced. It is therefore preferable that an excess air ratio preventing generation of a large amount of smoke or particulates is realized and an exhaust gas is, as much as possible, recirculated in each engine operating condition. The amount of the recirculated exhaust gas is generally expressed by the EGR rate which is the ratio the amount of the recirculated exhaust gas to the amount of the gas (the amount of fresh air and the amount of the recirculated exhaust gas) in the cylinders.

In this way, a combination of the excess air ratio and the EGR rate advantageous for reducing the amount of the generated $NO_x$ and particulates exists for each engine operating condition. Japanese Unexamined Patent Publication No. 2-61347 discloses a method of controlling an EGR control valve arranged in an exhaust gas recirculation passage in such a manner that the current excess air ratio constitutes a target excess air ratio for each engine operating condition.

In the case where the amount of the exhaust gas recirculated is reduced by controlling the EGR control valve, fresh air is liable to flow into the cylinders in a proportionately greater amount. If the amount of the exhaust gas recirculated is increased, in contrast, it becomes more difficult for the fresh air to flow into the cylinders. As a result, this control can realize a combination of the excess air ratio and the EGR rate advantageous for reducing the amount of the generated $NO_x$ and particulates in each engine operating condition.

At the time of transient engine operation, however, in spite of the fact that intake air is delayed, the amount of the recirculated exhaust gas can be reduced excessively in an attempt to realize a target excess air ratio after a change in the engine operating condition, in which case the amount of generated $NO_x$ increases considerably.

SUMMARY OF THE INVENTION

Accordingly, the object of the present invention is to provide a control apparatus for an internal combustion engine comprising an exhaust gas recirculation means, in which the amount of the generated $NO_x$ and particulates at the time of a transient engine operating condition can be reduced over the prior art.

According to the present invention, there is provided a control apparatus for an internal combustion engine with an exhaust gas recirculation means comprising: grasping means for grasping an optimum relational expression between an excess air ratio and an EGR rate in a transient engine operating condition changing to a certain engine operating condition, each combination of the excess air ratio and the EGR rate in the relational expression optimizing an amount of generated paticulates and an amount of generated $NO_x$, The present invention will be more fully understood from the description of preferred embodiments of the invention set forth below, together with the accompanying drawings.

BRIEF DESCRIPTION OF THE DRAWINGS

In the drawings:

FIG. 5 is a second routine for controlling the opening of the EGR control valve.

DESCRIPTION OF THE PREFERRED EMBODIMENT

Figure 1:
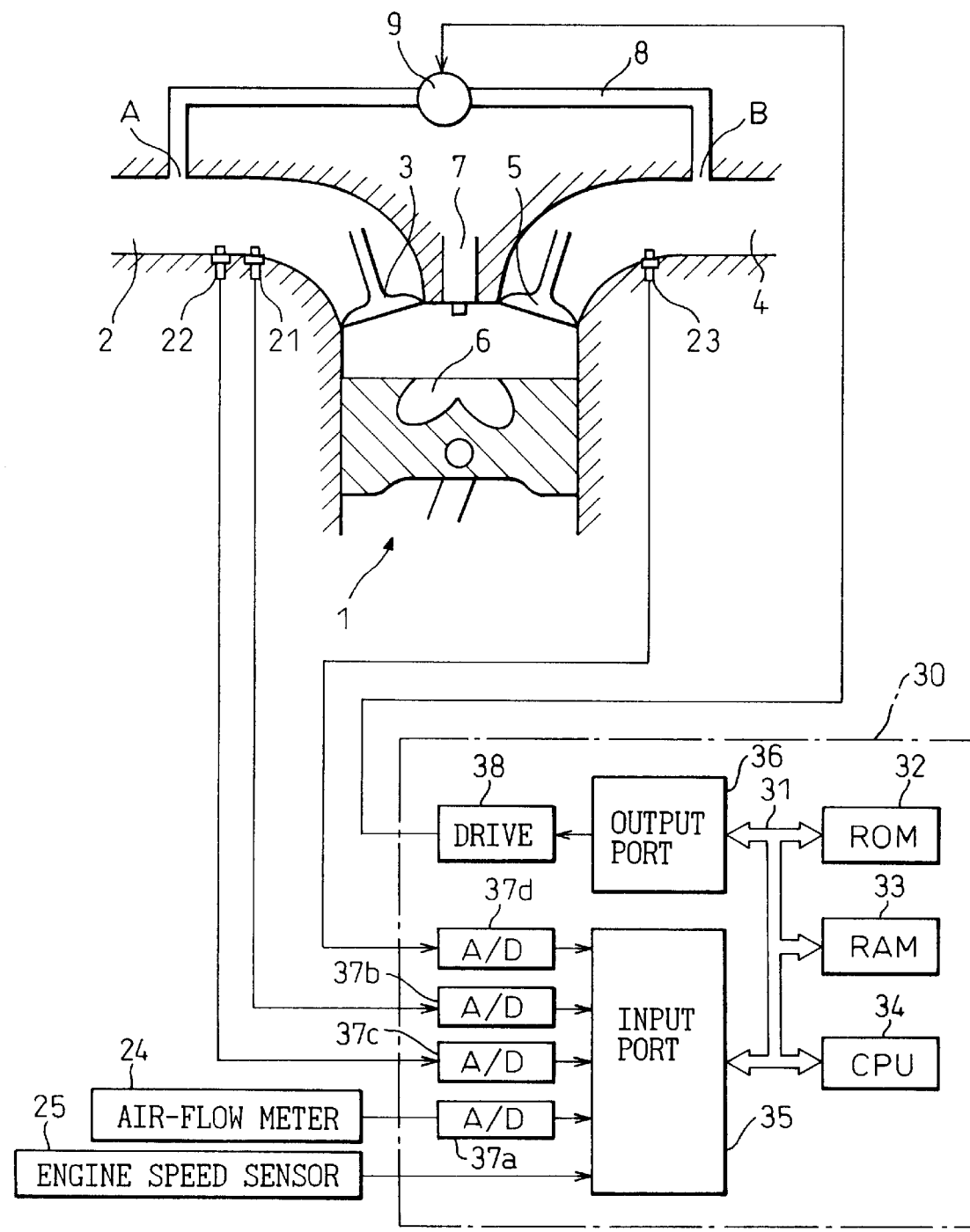
FIG. 1 is a sectional view schematically showing an internal combustion engine in which a control apparatus according to the present invention is mounted.

FIG. 1 is a sectional view schematically showing an internal combustion engine equipped with a control apparatus according to the present invention. In this drawing, 1 designates a diesel engine body. 2 designates an intake passage communicating with the cylinders through an intake valve 3, and 4 an exhaust passage communicating with the cylinders through an exhaust valve 5. 6 designates a combustion chamber formed at the top of the piston, and 7 a fuel injector for injecting the fuel into the combustion chamber 6. The fuel injector 7 is connected to an ordinary fuel injection pump (not shown) to control the amount of injected fuel on the basis of the engine load, the engine speed, etc. 8 designates an exhaust gas recirculation passage (EGR passage) communicating between the intake passage 2 and the exhaust passage 4. This EGR passage has arranged therein an EGR control valve 9 for controlling the amount of the recirculated exhaust gas.

Reference numeral 30 designates an electronic control unit (ECU) for controlling an opening of the EGR control valve 9. The ECU 30 is constructed as a digital computer and includes a ROM (read only memory) 32, a RAM (random access memory) 33, a CPU (microprocessor, etc.) 34, an input port 35, and an output port 36, which are interconnected by a bidirectional bus 31. An air-flow meter 24, which is arranged upstream of the confluence A of the EGR passage in the intake passage 2, is connected to the input port 35 via an AD converter 37a. A pressure sensor 21 and a temperature sensor 22, which are arranged downstream of the confluence A of the EGR passage in the intake passage, are connected to the input port 35 via AD converters 37b and 37c, respectively. An engine speed sensor 25 is connected to the input port 35. An oxygen sensor 23, which is arranged upstream of the branch B of the EGR passage in the exhaust passage 4, is connected to the input port 35 via an AD converter 37d. The EGR control valve 9 is connected to the output port 36 via a drive circuit 38.

In each engine operating condition, there exists a combination of an optimum excess air ratio not generating much smoke and much particulates and an optimum EGR rate not generating much $NO_x$ for the amount of injected fuel determined by a fuel injection pump. In the same engine operating condition, the amount of fresh intake air increases with a decrease in the amount of the recirculated exhaust gas, while the amount of fresh intake air decreases with an increase in the amount of the recirculated exhaust gas. As a result, at the time of a steady engine operating condition, it is a common practice that the control unit 20 regulates the amount of the recirculated exhaust gas by controlling the opening of the EGR control valve 9 in such a manner that the current excess air ratio detected by the oxygen sensor 23 provides an optimum excess air ratio for each engine operating condition, thereby realizing an optimum excess air ratio and an optimum EGR rate for a satisfactory amount of generated $NO_x$, smoke, and particulates.

Figure 2:
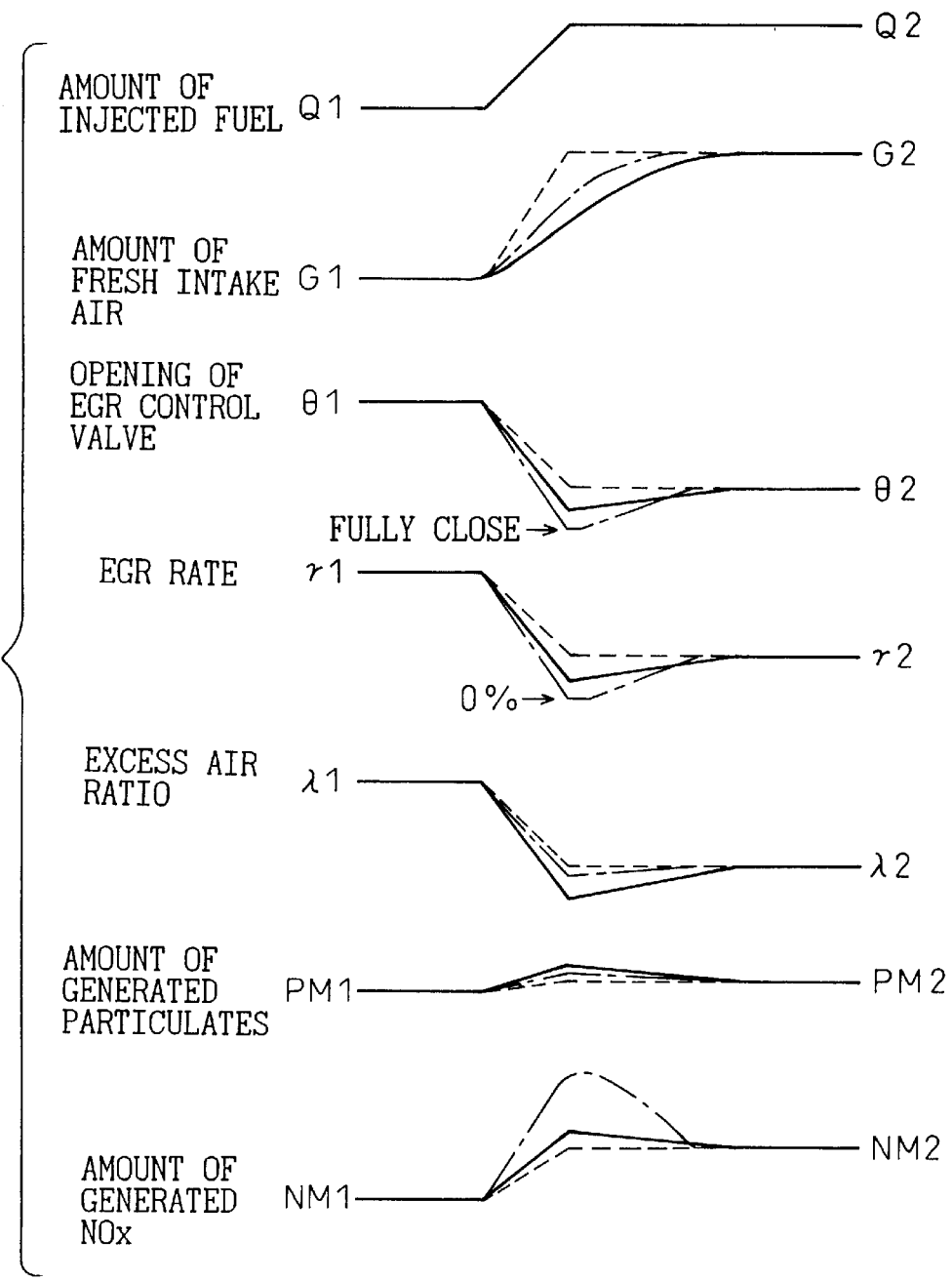
FIG. 2 is a time chart showing changes in the fuel injection amount, the amount of fresh air supplied into the cylinder, the opening of the EGR control valve, the EGR rate, the excess air ratio, the amount of generated particulates and the amount of generated $NO_x$ at the time of engine acceleration.

FIG. 2 is a time chart showing the changes in the amount of injected fuel Q, the amount G of fresh intake air supplied into the cylinder, the opening θ of the EGR control valve, the EGR rate γ, the excess air ratio λ, the amount PM of generated particulates, and the amount NM of generated $NO_x$. In this time chart, each dotted line indicates the case in which each value (with a suffix 1) for a specified engine steady operating condition before acceleration has changed ideally to a corresponding value (with a suffix 2) for another specified engine steady operating condition after acceleration.

Each one-dot chain denotes the case in which the opening of the EGR control valve 9 is controlled in an ordinary manner as described above, i.e., the case in which the opening of the EGR control valve is controlled in such a manner as to realize an optimum excess air ratio λ2 in the specified engine steady operating condition after acceleration. This case will be explained below. At the time of engine acceleration, the amount of fresh intake air G cannnot increase in accordance with the increase of the amount of injected fuel Q, so that the increase of the amount of fresh intake air is considerably delayed. As a result, the opening of the EGR control valve 9 is quickly made fully closed, and the exhaust gas recirculation is suspended. The delayed increase of the amount of fresh intake air is restored to some extent in this way, and thus, an almost optimum excess air ratio λ2 is realized with the increase of the amount of injected fuel Q.

This control operation reduces the amount PM of generated particulates. Since the exhaust gas recirculation is temporarily stopped, however, the amount NM of generated $NO_x$ is intolerably increased. With the control unit 20 according to this embodiment, therefore, the following control operations are carried out at the time of transient engine operating condition.

Figure 3:
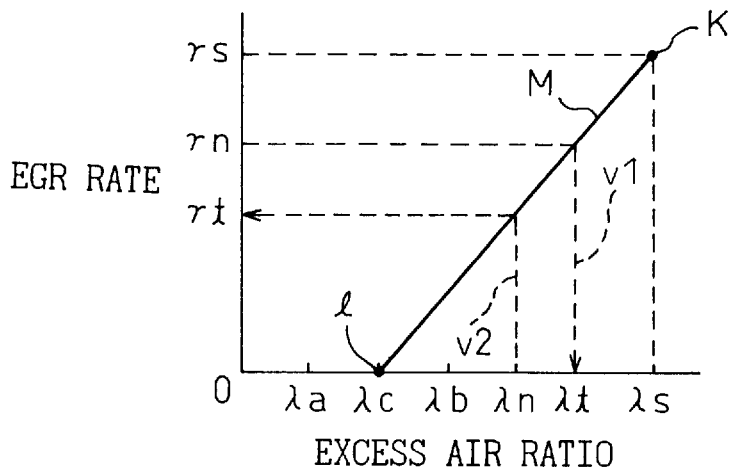
FIG. 3 is a map showing the relation between excess air ratio and EGR rate.

FIG. 3 is a map showing the relationship between excess air ratio and EGR rate. In this drawing, k is a point indicating a combination of an optimum excess air ratio λs and an optimum EGR rate γs in a specified engine operating condition. λa designates an excess air ratio with no recirculated exhaust gas for providing the same amount of generated $NO_x$ as in the case where the combination of the optimum excess air ratio λs and the optimum EGR rate γs has been realized in this specified engine operating condition. λb designates an excess air ratio with no recirculated exhaust gas for providing the same amount of generated particulates as in the case where the combination of the optimum excess air ratio λs and the optimum EGR rate γs has been realized in this specified engine operating condition. λc designates the central point between λa and λb, i.e., a value calculated by λc=(λa+λb)/2.

In the case where this specified engine operating condition is achieved through a transient engine operating condition, if an excess air ratio and a EGR rate during the transient engine operating condition exist on a straight line M passing the above-mentioned point k and the point l associated with the excess air ratio λc and EGR rate of 0%, as shown in the solid lines in the time chart of FIG. 2, the excess air ratio becomes below λ2 (As in FIG. 3) so that the amount of generated particulates PM slightly increases, and the EGR rate becomes below γ2 (γs in FIG. 3) so that the amount of generated $NO_x$ slightly increases. However, each generated amount can be made to be within each tolerable range.

Figure 4:
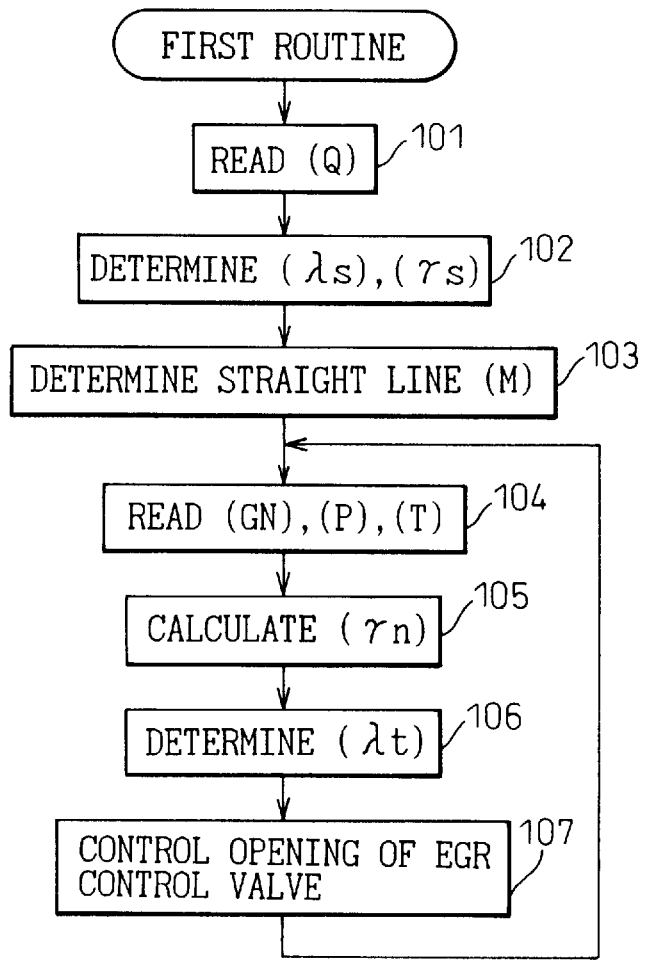
FIG. 4 is a first routine for controlling the opening of the EGR control valve.

FIG. 4 is a first routine for controlling the opening of the EGR control valve 9 in order to realize the above-mentioned excess air ratio and the above-mentioned EGR rate during a transient engine operating condition. First, at step 101, the current amount of injected fuel Q is read from the fuel pump. Then, at step 102, an optimum excess air ratio λs and an optimum EGR rate γs when the current engine operating condition based on the amount of injected fuel Q and the current engine speed N is made steady are determined from a map or the like.

Then, at step 103, as described with reference to FIG. 3, a relational expression (straight line M) between an optimum excess air ratio and an optimum EGR rate during a transient engine operating condition is calculated, or determined using a map or the like. Then, at step 104, an intake air weight GN detected by the air-flow meter 24 and, gas pressure P and gas temperature T downstream of the confluence of the EGR passage 8 in the intake passage 2 detected by the pressure sensor 21 and the temperature sensor 22, respectively, are read. This gas is a mixture of fresh intake air and the recirculated exhaust gas.

Next, at step 105, the recirculated exhaust gas weight GEGR is calculated from equation (1) below, and the current EGR rate γn is calculated by equation (2) below.

$$GEGR = f(P/T) - GN \qquad (1)$$

$$\gamma n = GEGR/(GN+GEGR) \qquad (2)$$

Then, at step 106, as shown by arrow v1 in FIG. 3, the excess air ratio λt satisfying the relation of the straight line M with respect to the current EGR rate γn is calculated, and at step 107, the opening of the EGR control valve 9 is controlled with this excess air ratio λt as a target excess air ratio.

FIG. 5 is a second routine for controlling the opening of the EGR control valve 9 in order to realize an optimum excess air ratio and an optimum EGR rate during a transient engine operating condition. Unlike in the first routine where a target excess air ratio is determined on the basis of an actual EGR rate during a transient engine operating condition, the second routine is for determining a target EGR rate on the basis of the actual excess air ratio. The differences between the first and second routines are explained follows. In the second routine, at step 203, the straight line M is calculated, thereafter, at step 204 the output V of the oxygen sensor 23 is read and at step 205 the current excess air ratio λn is determined on the basis of the output V.

Then, at step 26, as shown by arrow v2 of FIG. 3, an EGR γt satisfying the relation of the straight line M with respect to the current excess air ratio λn is calculated, and at step 207, the opening of the EGR control valve 9 is controlled with this EGR rate γt as a current target EGR rate.

In the first and second routines, once the opening of the EGR control valve 9 is veried, the current EGR rate or the current excess air ratio is veried, and the target excess air ratio or the target EGR rate is also veried. The opening of the EGR control valve, therefore, is preferably controlled by a feedback control till an amount of injected fuel varies, as shown in FIGS. 4 and 5. This embodiment, which refers to a diesel engine, is not intended to limit the present invention. The present invention is directly applicable to a spark ignition internal combustion engine in which the amount of intake air is not controlled. Also, the invention is applicable to an internal combustion engine having a throttle valve or an intake air amount control valve since the increase of air intake is delayed with respect to a predetermined opening of the throttle valve or the intake air amount control valve during the transient engine operating condition.

Although the invention has been described with reference to specific embodiments thereof, it should be apparent that numerous modifications can be made thereto, by those skilled in the art, without departing from the basic concept and scope of the invention.

I claim:

1. A control apparatus for an internal combustion engine with an exhaust gas recirculation means comprising:

grasping means for grasping an optimum relational expression between an excess air ratio and an EGR rate in a transient engine operating condition changing to a certain engine operating condition, each combination of said excess air ratio and said EGR rate in said relational expression optimizing an amount of generated paticulates and an amount of generated $NO_x$, said relational expression containing a combination of an optimum excess air ratio and an optimum EGR rate in said certain engine operating condition;

determining means for determining one of a current excess air ratio and a current EGR rate; and control means for controlling said exhaust gas recirculation means so as to realize the other of an excess air ratio and an EGR rate satisfying said relational expression with respect to said one of said current excess air ratio and said current EGR rate.

2. An apparatus according to claim 1, wherein said relational expression contains a combination of a first excess air ratio and 0% of EGR rate, said first excess air ratio being between a second excess air ratio with no recirculated exhaust gas providing the same amount of generated paticulates as in the case of said combination of said optimum excess air ratio and said optimum EGR rate in said certain engine operating condition and a third excess air ratio with no recirculated exhaust gas providing the same amount of generated $NO_x$ as in the case of said combination of said optimum excess air ratio and said optimum EGR rate in said certain engine operating condition.

3. An apparatus according to claim 2, wherein said first excess air ratio is an average of said second excess air ratio and said third excess air ratio.

4. An apparatus according to claim 1, wherein said relational expression is linear.

5. An apparatus according to claim 2, wherein said relational expression is linear.

6. An apparatus according to claim 3, wherein said relational expression is linear.

7. An apparatus according to claim 1, wherein said determining means determines said current excess air ratio, said control means controls said exhaust gas recirculation means so as to realize an EGR rate satisfying said relational expression with respect to said current excess air ratio.

8. An apparatus according to claim 1, wherein said determining means determines said current EGR rate, said control means controls said exhaust gas recirculation means so as to realize an excess air ratio satisfying said relational expression with respect to said current EGR rate.

9. An apparatus according to claim 1, wherein the determination of said determining means and the control of said control means are repeated by feedback.

* * * * *